United States Patent
Kruger et al.

(10) Patent No.: US 7,197,634 B2
(45) Date of Patent: Mar. 27, 2007

(54) SYSTEM AND METHOD FOR UPDATING DEVICE FIRMWARE

(75) Inventors: Jack C. Kruger, Round Rock, TX (US); Ahmad A. J. Ali, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 310 days.

(21) Appl. No.: 10/758,771

(22) Filed: Jan. 16, 2004

(65) Prior Publication Data

US 2005/0160257 A1 Jul. 21, 2005

(51) Int. Cl.
*G06F 13/10* (2006.01)

(52) U.S. Cl. ............... 713/1; 713/2; 719/321; 717/173; 717/176

(58) Field of Classification Search .............. 713/1, 713/2; 719/321; 717/173, 176
See application file for complete search history.

(56) References Cited

U.S. PATENT DOCUMENTS

| | | | | |
|---|---|---|---|---|
| 6,351,270 B1* | 2/2002 | Nishikawa et al. | ......... | 715/717 |
| 6,467,087 B1* | 10/2002 | Yang | ........................ | 717/168 |
| 6,473,899 B1* | 10/2002 | Nelson et al. | ............... | 717/173 |
| 6,481,010 B2* | 11/2002 | Nishikawa et al. | ........... | 725/44 |
| 6,507,881 B1* | 1/2003 | Chen | ........................ | 710/305 |
| 6,584,559 B1* | 6/2003 | Huh et al. | ..................... | 713/2 |
| 6,640,334 B1* | 10/2003 | Rasmussen | ................. | 717/171 |
| 6,754,723 B2* | 6/2004 | Kato | ............................ | 710/8 |
| 6,954,850 B1* | 10/2005 | Howard et al. | ................ | 713/1 |
| 6,981,136 B2* | 12/2005 | Fuse et al. | ..................... | 713/2 |
| 2002/0166027 A1* | 11/2002 | Shirasawa et al. | .......... | 711/114 |
| 2005/0120858 A1* | 6/2005 | Fitzgerald et al. | ............... | 84/1 |
| 2005/0158100 A1* | 7/2005 | Yamaguchi et al. | .......... | 400/62 |

* cited by examiner

*Primary Examiner*—A. Elamin
(74) *Attorney, Agent, or Firm*—Baker Botts L.L.P.

(57) ABSTRACT

A system and method is disclosed for providing updated firmware to remote devices. The firmware update is downloaded to the remote device and stored at a storage location at the remote device. Following the successful download and storage of the firmware update, an indicate is set to identify that a firmware update is available. The firmware of the device is updated with the software of the firmware update during the next boot of the device.

15 Claims, 2 Drawing Sheets

SYSTEM AND METHOD FOR UPDATING DEVICE FIRMWARE

TECHNICAL FIELD

The present disclosure relates generally to the field of computer or information systems, and, more particularly, to a system and method for updating the firmware of a device in a network.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems contain one or more hard disk drives, and each disk drive will typically include firmware that governs the operation of the disk drive. From time to time, it may be necessary or desirable to update or upgrade the firmware of a disk drive. A firmware upgrade may be desirable to correct errors in or improve the performance of associated hard disk drive. In a networked environment, updates of the firmware of a hard disk drive are often accomplished remotely. In this process, a system administrator or user transmits the firmware update to the hard disk drive and then remotely initiates the update of the firmware of the hard disk drive. Remote updates of firmware often occur on an online basis. As such, the network remains online or in operation during the period that the firmware of a hard disk drive of the network is being updated.

Updating the firmware of a hard disk drive while the hard disk drive is online presents difficulties. The firmware of a hard disk drive is typically saved in flash memory associated with and integral to the hard drive. During the firmware update process, the hard disk drive writes the firmware update to the flash memory location. During the period that the hard disk drive is writing the firmware update to flash memory, the hard drive does not respond to access requests. As a further complication, other elements of the network, including network controllers and host applications, may not be aware that a hard drive has ignored access requests as part of a firmware update processing being performed at the hard disk drive. An attempted access to the hard drive may time out, and one or more network elements may identify the hard disk drive as a failed drive and initiate failover procedures, which may be unnecessary or interfere with the firmware update procedure.

As an alternative to a online firmware update process, the firmware of a hard disk drive may be updated according to an offline process. In a typical offline process, the hard disk drive is removed from the network and the update is performed in a standalone DOS mode. Although an offline update process may reduce or eliminate the risk associated with disk accesses occurring during the firmware update process, an offline update process increases server down time. In addition, the ease of performing an offline firmware update is greatly influenced by the location of the hard disk drive and the configuration of the computing device that includes the hard disk drive. A hard disk drive, for example, may be located in a server that is located in a locked cabinet. In addition, the server may be configured as a so-called headless server. As such, the storage device may not include peripheral input or output devices, such as a keyboard, mouse, video display, or floppy drive, making an offline update of the firmware of the hard disk drive quite difficult. In addition, the offline firmware update process presents a risk of disk corruption. The firmware of the disk drive could be corrupted if a loss of power occurs during the time that the disk drive is overwriting its own operating code. A sudden loss of power could cause the firmware of the hard disk drive to be overwritten and yet only partially updated.

SUMMARY

In accordance with the present disclosure, a system and method for updating device firmware is disclosed in which the firmware update is stored in a storage location in the device. If the firmware update is stored successfully, a success flag or indicator is set. During the next boot of the device, the device recognizes that a firmware update indicator has been set and the firmware of the device is updated with the firmware update that is stored in the storage location as part of the boot process.

A technical advantage of the disclosed system and method is the ability to perform an online update of hard disk drive firmware in a network environment. Because the system and method disclosed herein provide for the online updating of hard disk drive firmware, the server down time is reduced in comparison with traditional offline techniques for update the firmware of a hard disk drive. Another technical advantage of the disclosed system and method is that the method includes a step in which the download of the firmware update to the hard disk drive was a success. Separating the download step from the step of overwriting the existing firmware insures that the firmware update was successfully downloaded, thereby enhancing the data integrity of the firmware update. In addition, the separation of the download step and the overwriting step provides a technique for reducing or avoiding the possibility of data corruption in the flash memory space of hard disk drive firmware. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
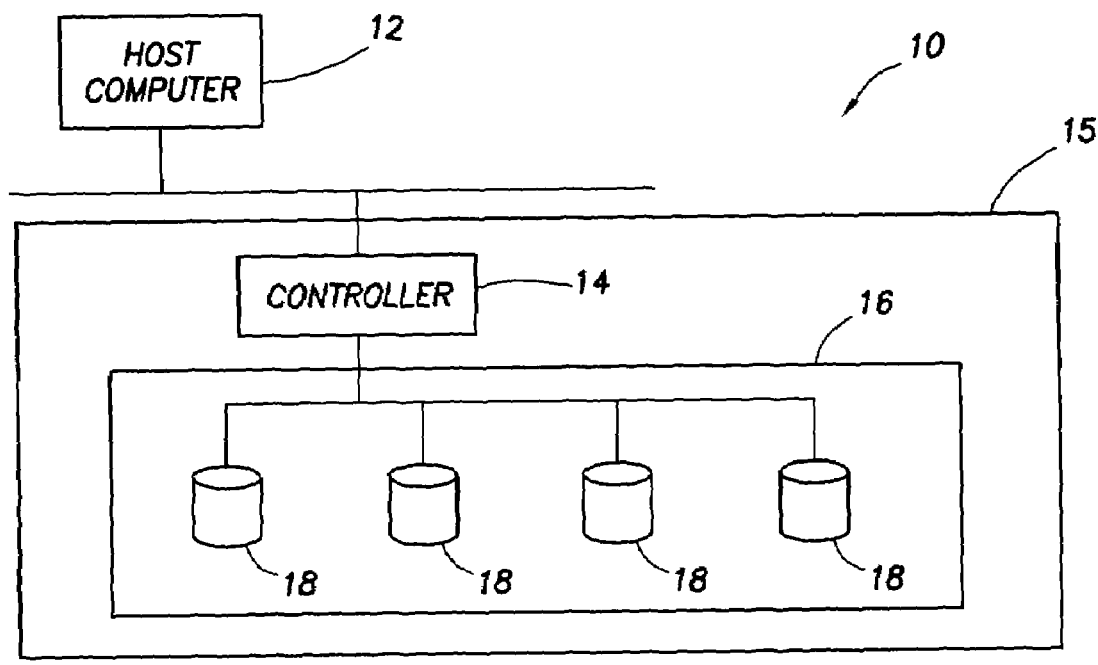
FIG. 1 is a network diagram of a computer network.
Figure 2:
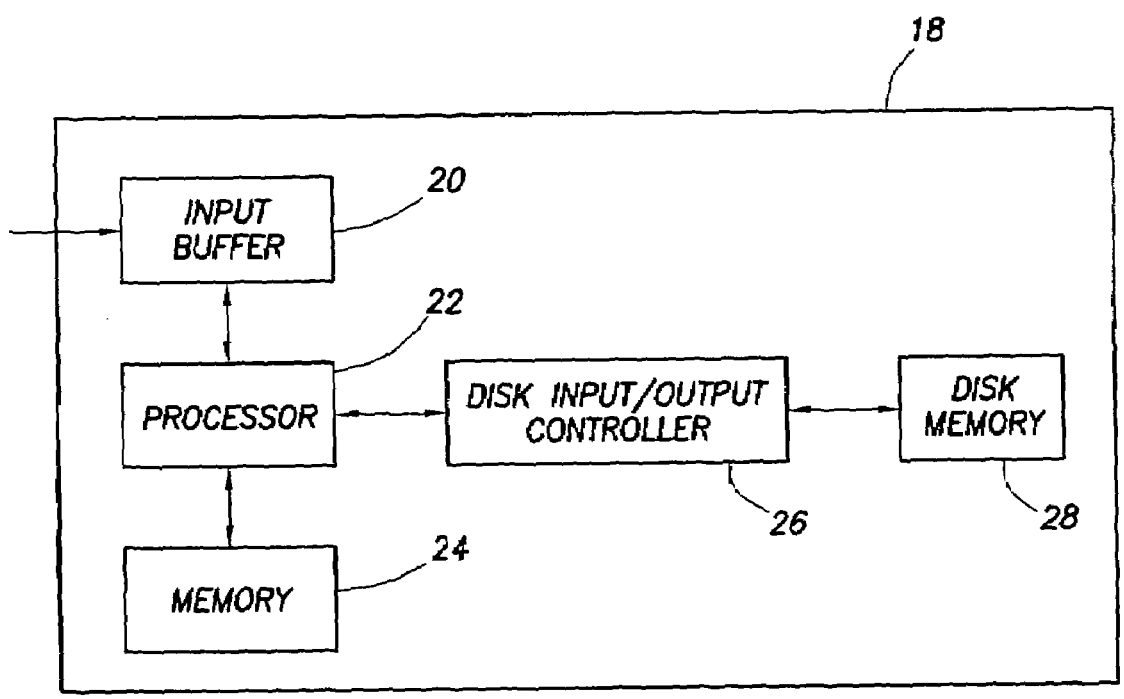
FIG. 2 is a flow diagram of a method for downloading firmware to a device.

Shown in FIG. 1 is a network, which is generally indicated at 10. Network 10 is includes a host computer 12, which is coupled via a bus to a storage subsystem 15. Storage subsystem 15 includes a controller 14 that is coupled to a storage array 16, which includes a number of hard disk drives 18. It should be recognized that network 10 is just one example of a computer network that includes at least one hard disk drive as a network element. The system and method disclosed herein may be employed in any number of network topologies, operating according to one of several known communications protocols. Shown in FIG. 2 is a functional block diagram of a hard disk drive 18. Each hard disk drive 18 includes an input buffer 20 that communicates with a processor 22. Processor 22 is coupled to a disk memory input/output controller 26, which is in turn coupled to disk memory 28. Processor 24 is also coupled to flash memory 24, which holds the firmware that serves as the operating code for processor 24.

The system and method disclosed herein provides for a firmware upgrade in the hard disk drives of the network according to a process in which the firmware update is first stored in a storage site in the hard disk drive, and the storage of the firmware update at the storage site is verified as having successfully occurred. The disclosed system and method provides a technique for an online update of the firmware of a hard disk drive that is immune from or less susceptible to corruption of the flash memory of the hard disk drive. A firmware update is not performed at the hard disk drive unless there has first been a successful download of the firmware update to the storage location on the hard disk drive. Once a successful download of the firmware update has occurred, the possibility of firmware corruption is minimized, as a complete copy of the firmware update exists in the hard disk drive and can be transferred repeatedly to the flash memory of the hard disk drive until a successful transfer occurs.

Figure 3:
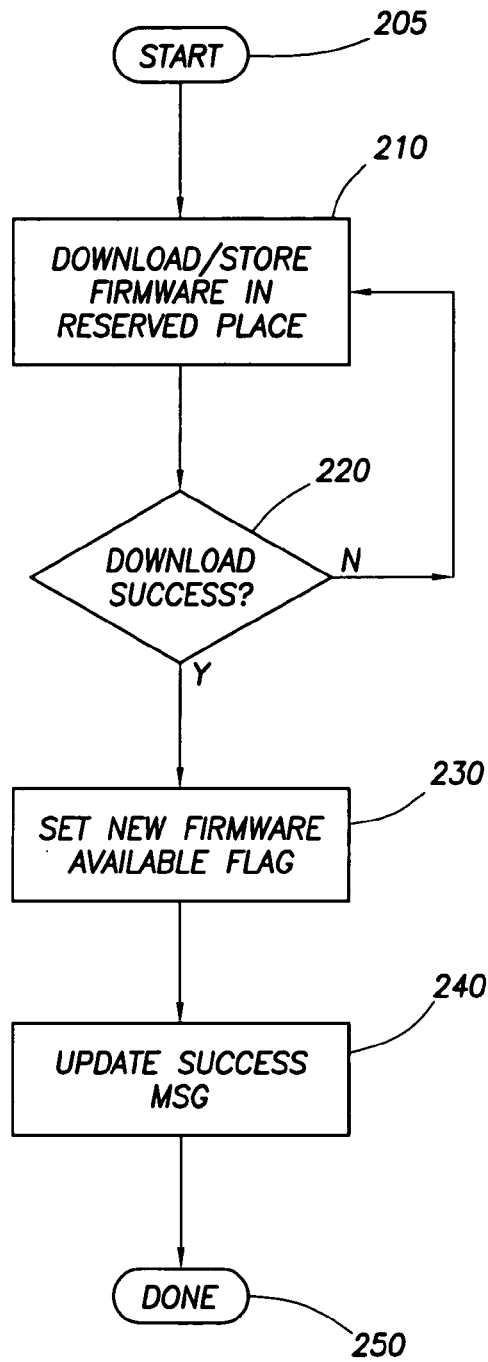
FIG. 3 is a flow diagram of a method of performing an online update of the firmware of a hard disk drive.

With reference to FIG. 1, the firmware download and update process may be initiated by host computer 12. The method steps for downloading a firmware update to a hard disk drive are shown in FIG. 3. At step 210, the firmware is downloaded to the hard disk drive and stored in a group of reserved blocks or another dedicated storage space in the hard disk drive. The dedicated storage space for the firmware update may be located on the disk storage space of the hard disk drive. Following the step of downloading and storing the firmware update, it is determined at step 220 whether the download and storage steps were successful. A verification of the success of the firmware update download and storage step may include an analysis of the data integrity of the data stored in the dedicated storage location. If the step of downloading and storing the firmware was not successful, the method continues at step 210, where the downloading and updating step is performed again. The download and storage step will time out after a predetermined number of unsuccessful download and storage attempts. If the download and storage of the firmware update was a success, a new firmware availability flag is set in the hard disk drive at step 230 to indicate that a firmware update is available. Because a new firmware update availability will not be set until the firmware download and storage step is successfully completed. A boot of the hard disk drive will not cause an update of the firmware until a new firmware update availability flag has been set.

A new firmware availability flag identifies that new firmware has been successfully downloaded onto the hard drive. The new firmware availability flag may be a register in the memory of the hard drive. Alternatively, the new firmware availability flag may be a flag within a data structure in the hard drive.

In FIG. 3, at step 240, a success message is issued to the system administrator to indicate that the download of the firmware was successful. The success message provides a notification to the system administrator that the firmware has been successfully downloaded to the hard drive. Following the issuance of the success message, the firmware of the hard disk drive may be updated at the convenience of the system administrator by an initiated boot of the hard disk drive. The firmware may also be updated at the next regularly scheduled boot of the hard disk drive. At step 250, the steps of downloading and storing a firmware update to the hard disk drive are complete.

Figure 4:
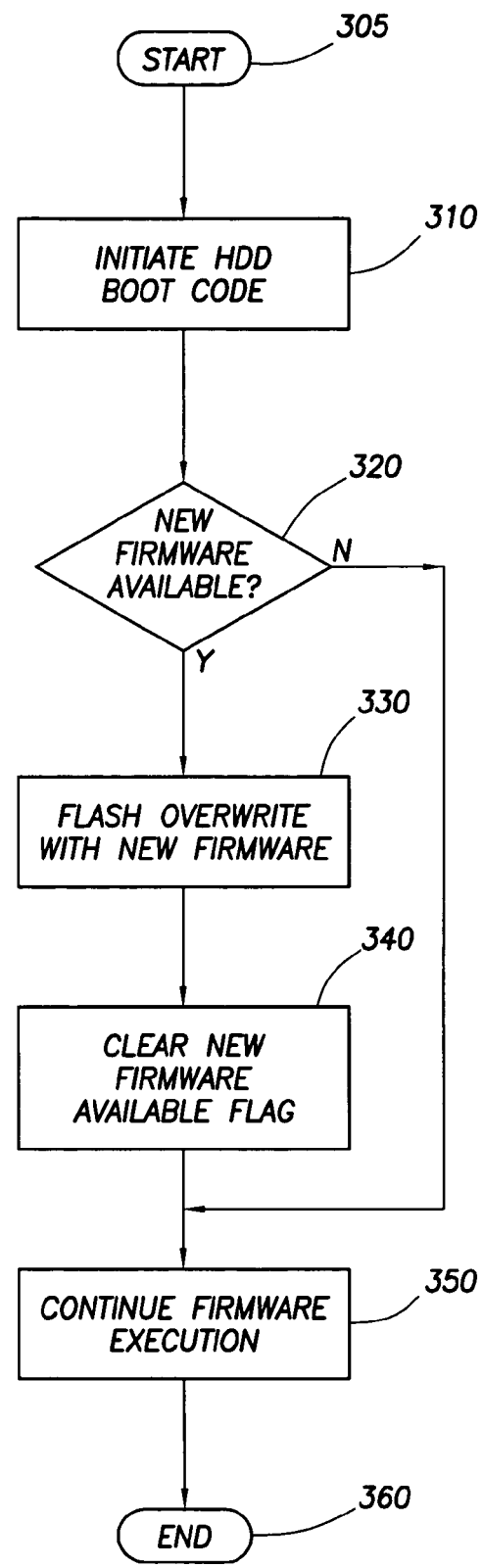
FIG. 4 is a flow diagram of a method for updating the firmware of a hard disk drive.

Shown in FIG. 4 are a series of method steps for updating the firmware on a hard disk drive. At step 310, the boot code or software of the hard disk drive is initiated. A hard drive boot code may be firmware that includes a boot code or a boot loader. The boot code of the hard disk drive typically exists in the firmware of the hard disk drive. The boot code of the hard disk drive is initiated as a result of a boot of the hard disk drive. The administrator may initiate the boot or the boot may occur as a result of any restart of the hard disk drive. As part of the boot process, it is determined at step 320 whether new firmware is available is available for the hard disk drive. The presence of new firmware is determined by checking the new firmware availability flag, which, as described with respect to FIG. 2, indicates that a firmware update has been successfully downloaded and stored in a storage location in the hard disk drive. If new firmware for the hard disk drive is not available, boot process continues at step 350 with the execution of the current boot code of the firmware of the hard disk drive.

If new firmware is available, the existing firmware of the hard disk drive, which is typically stored in the flash memory of the hard disk drive, is overwritten at step 330 with the new firmware. As an example, the existing contents of flash memory may be overwritten with a firmware update that was previously stored in the disk memory of the hard disk drive. At step 340, the new firmware availability flag is cleared. The hard disk drive processor executes the new firmware. At step 350, the boot of the hard disk drive continues with the execution of the boot code of the firmware of the hard disk drive. In this example, following the overwrite of existing firmware with new firmware, the boot code is boot code associated with the updated firmware. At step 360, the process of updating the firmware at the hard disk drive is complete.

Because the firmware update process disclosed herein occurs during the boot of the hard disk drive, the chance of the hard disk drive ignoring or missing access requests or diminished or eliminated entirely. The disclosed firmware update process does not markedly interfere with or lengthen the boot process. Instead, the boot process includes the additional step of overwriting the firmware of the hard disk drive in the event that it is determined that a new firmware update is available. It is not necessary to reboot the hard disk drive a second time in order to execute the software of the firmware update. The firmware update technique disclosed herein separates the steps of downloading the firmware and updating the firmware. As such, if a catastrophic failure occurs at the hard disk drive during either the download step or the update step, the hard disk drive will not fail as a result of the execution of corrupted firmware. If a failure occurs during the download step, the download step is repeated until the download of the firmware update is complete. If a failure occurs during the update process, the update process may be repeated, as a complete firmware update will exist in a defined storage location, such as disk memory, in the hard drive.

It should be recognized that the system and method disclosed herein may be employed for the purpose of updating firmware in devices other than hard disk drives. The firmware update process disclosed herein could be used for other network devices in those situations in which it is desirable to perform an online update of the firmware of the device. It should also be recognized that the system and method disclosed herein is not limited in its application to the format and topology of the network described herein. The system and method disclosed herein may be used with other networks, having varying formats and topologies. Although the present disclosure has been described in detail, it should be understood that various changes, substitutions, and alterations can be made hereto without departing from the spirit and the scope of the invention as defined by the appended claims.

What is claimed is:

1. A method for updating the existing firmware in a hard drive with replacement firmware, comprising the steps of:
   downloading the replacement firmware to the hard drive;
   storing the replacement firmware in a storage location in disk storage on the hard drive;
   determining if the replacement firmware was successfully downloaded to and stored at the hard drive;
   setting an indicator in the hard drive if the download and storage of the replacement firmware was successful; and
   replacing the existing firmware with the replacement firmware during the first boot of the hard drive following the successful download and storage of the replacement firmware to the hard drive, wherein the existing firmware is stored in a storage location that is separate from the disk storage of the hard drive.

2. The method for updating the existing firmware in a hard drive with replacement firmware of claim 1, further comprising of transmitting a massage to indicate that the download and storage of the replacement firmware was successful.

3. The method for updating the existing firmware in a hard drive with replacement firmware of claim 2, wherein the step of replacing the existing firmware with the replacement firmware further comprises the steps of:
   initiating a boot of the hard drive;
   determining whether the indicator identifies that the replacement firmware was successfully downloaded and stored to the hard drive;
   if the indicator identifies that that the replacement firmware was successfully downloaded and stored to the hard drive, replacing the existing firmware of the hard drive with the replacement firmware;
   clearing the indicator; and
   executing the replacement firmware as part of the boot of the hard drive.

4. The method for updating the existing firmware in a hard drive with replacement firmware of claim 1, wherein the existing firmware is stored in flash memory on the hard disk drive.

5. The method for updating the existing firmware in a hard drive with replacement firmware of claim 4, wherein the step of replacing the existing firmware with the replacement firmware comprise the step of writing the replacement firmware to the flash memory location of the existing firmware.

6. A network operable to update the firmware of a hard drive of the network, comprising:
   a host computer;
   a hard drive coupled through one or more network elements to the host computer, the hard drive being operable to:
   download replacement firmware from the host computer;
   save the replacement firmware to a storage location in disk storage on the hard drive;
   determine if the replacement firmware was successfully downloaded and saved to the location in the hard drive;
   set an indicator if the replacement firmware was successfully downloaded to the hard drive; and
   if the replacement firmware was successfully downloaded to the hard drive, replace the existing firmware of the hard drive with the replacement firmware during a boot of the hard drive, wherein the existing firmware is stored in a storage location that is separate from the disk storage of the hard drive.

7. The system of claim 6, wherein the hard drive is further operable to clear the indicator following the replacement of the existing software with the replacement software.

8. The system of claim 7, wherein the storage location of the existing firmware is flash memory of the hard disk drive.

9. The system of claim 8, wherein the hard drive is further operable to replace the existing firmware of the hard drive by reading the replacement firmware from its location in disk storage and writing the replacement firmware in the location of the existing firmware in flash memory.

10. A method for providing a firmware update in a remote hard drive, the method comprising the steps of:
    transferring the firmware update to the hard drive;
    storing the firmware update in a storage location in disk storage on the hard drive;
    setting an indicator in the hard drive if the steps of transferring and storing the firmware update were completed successfully;
    setting an indicator if the download and storage of the firmware update was successful to indicate that a firmware update is available; and
    updating the existing firmware with the firmware update during the next boot of the hard drive, wherein the existing firmware is stored in a storage location that is separate from the disk storage of the hard drive.

11. The method for providing a firmware update in a remote hard drive of claim 10, wherein the step of transferring the firmware update to the hard drive comprises the step of downloading the firmware update from a remote source.

12. The method for updating firmware in a remote hard drive of claim 11, further comprising the step of transmitting a message indicating that the download and storage of the firmware update was completed successfully.

13. The method for updating firmware in a remote hard drive of claim 12, wherein the step of updating the firmware during the next boot of the hard drive comprises the steps of:
monitoring whether the indicator has been set to indicate that replacement firmware is available;
writing the firmware update to the storage location associated with the existing firmware of the hard drive; and
completing the boot of the hard drive with the software of the firmware update.

14. The method for updating firmware in a remote hard drive of claim 13, wherein the step of writing the firmware update to the storage location associated with the existing firmware of the hard drive comprises the step of writing the firmware update over the existing firmware in the flash memory of the hard drive.

15. The method for updating firmware in a remote hard drive of claim 14, further comprising the step of clearing the indicator in the hard drive following the step of writing the firmware update over the existing firmware in the flash memory of the hard drive.

* * * * *